Patented Feb. 11, 1941

2,231,468

UNITED STATES PATENT OFFICE 2,231,468

HIGH SURFACE HIDING PIGMENT MATERIAL AND PROCESS OF MAKING THE SAME

Marion L. Hanahan, Wilmington, Del., assignor to E. I. du Pont de Nemours & Company, Wilmington, Del., a corporation of Delaware No Drawing. Application December 8, 1938, Serial No. 244,570

17 Claims. (Cl. 134—58)

This invention relates to the art of white extender materials. More particularly it relates to the improvement of the properties of white extender materials. Still more particularly it relates to the improvement of the hiding power of white extender materials in flat paint formulations, paper coating compositions, etc.

White extender materials, such as anhydrite, gypsum, calcium sulfite, barium sulfate, calcium carbonate, barium carbonate, silica, magnesium silicates, aluminum silicates, and the like, having indices of refraction of less than about 1.7 are used widely in flat paints as diluents or extenders for white pigment materials such as titanium oxide, titanates of divalent metals, lithopone, zinc sulfide, zinc oxide, antimony oxide, white lead, and the like, comprising prime white pigments having a refractive index of not less than about 1.9. Such white extender materials cheapen the flat paint and by effecting wider separation of the pigment material particles in the paint film increase the effectiveness of said pigment material. However, said extenders have little hiding power of themselves.

I have now discovered that the hiding power of white extender materials may be increased markedly if there is imparted to said extender materials a property which I call "surface hiding power" and which I shall discuss in more detail below. Furthermore, I have discovered a process whereby the property of high surface hiding power may be imparted to white extender materials, thereby producing unique extenders of considerable industrial importance. Such extenders have high hiding power in flat paint formulations and as a result, have high flat hiding power in such formulations. Furthermore, I have discovered that they have much higher opacifying and brightening power in paper and in starch and casein coating compositions applied to the surface of paper than do corresponding prior art extender materials. As a matter of fact, I have discovered that white extenders having the property of high surface hiding power produce high hiding, opacifying and/or brightening in all extender-adhesive systems in which the mean index of refraction of the adhesive system is substantially lower than 1.5. A sheet of paper, for example, can be considered to be an adhesive comprising essentially paper fiber having an index of refraction of approximately 1.53 and air of index of refraction of 1. The mean index of refraction of said adhesive is substantially lower refraction of 1.5 and extenders therein having high surface hiding power are definitely better opacifying and brightening agents than are comparable prior art low surface hiding power extenders. Again, flat paint films, in which I have found high surface hiding extenders to be so effective, comprise numerous void spaces and/or extender-air interfaces. As a consequence, the effective mean index of refraction of the adhesive portion is substantially lower than that of the binder portion, e. g., is substantially lower than 1.5. I have discovered, however, that in extender-adhesive systems in which the effective mean index of refraction of the adhesive approximates or exceeds 1.5, such as enamel paint films in which the extender is essentially immersed in the binder, high surface hiding power extender materials do not have markedly improved hiding power.

For a better understanding of the characteristics desired in extender materials used in flat paint formulations, it will be necessary to explain the various terms used herein and the method of testing employed:

Flat paint formulation

A flat paint formulation produces a dry paint film in which the binder portion is insufficient to fill all void spaces between pigment and extender particles and which in consequence has a micro rough surface of relatively low specular reflection. Such a paint has a pigment and extender content in excess of about 40% by volume on the dry film and usually in excess of about 50% by volume.

On the other hand, an enamel paint formulation produces a dry paint film in which the binder portion is sufficient to fill essentially all void spaces between pigment and extender particles and which in consequence has a micro smooth surface of relatively high specular reflection. Such a paint has a pigment and extender content of less than about 35% by volume on the dry film and usually less than about 30% by volume.

Hiding power

Hiding power may be defined qualitatively as that property of a paint which enables it to obliterate beyond recognition any background over which it may be spread. Mathematically, it may be expressed as square feet per gallon of paint.

It is determined by the procedure entitled "Krebs dry film incomplete hiding power" described by Henry A. Gardner in "Physical and Chemical Examination of Paints, Varnishes, Lacquers and Colors," 8th edition, January 1, 1937, pp. 45–51.

In this test the paints being studied are painted out on a surface on which a design of concentric light and dark diamonds is printed. The light and dark bands are ½ inch wide. Their lightness factors are 75% and 40% respectively. The area of the surface is one square foot. It is printed on heavy paper and then coated with a nitrocellulose lacquer. In applying the paint a 20 cubic centimeter Luer type glass syringe filled with the paint, and the brush also filled with the paint, are weighed together. The paint is spread uniformly over the chart with the syringe and then spread with the brush. The syringe and brush are again weighed. Several brushouts, for example, six or eight are made with a paint selected as the standard, beginning with five to seven cubic centimeters of paint and increasing the amount in increments of 0.5 to 1.0 cubic centimeter. The application of the paint by volume is merely a guide. The actual weight of the paint applied, as determined by the difference in weight of the syringe and brush before and after application, is used in the calculation. Two or three brushouts of the paints to be compared are then prepared with different quantities of paint such as 6, 7 and 8 cubic centimeters.

When dry, the brushouts are numbered consecutively in the order of increasing quantity of paint for identification. The sample brushouts are then located with respect to their degree of hiding by placing each of them between reference standards showing less or more hiding. If possible, the ratings should be estimated in tenths. Thus 2.4 means that the sample is located 0.4 of an interval between standards No. 2 and No. 3.

The hiding power of a paint is calculated as follows:

$$\text{Hiding power} = \frac{\text{volume of standard paint}}{\text{volume of sample paint}} \times 100$$

when the volume of standard paint is that required to give the same contrast as that given by the volume of sample paint.

The following is a specific example of a hiding power determination made by this method:

Weight of standard paint per gal. = 15.69 lbs.
Weight of sample paint per gal. = 13.54 lbs.
Brushout of sample = 5.40 g.
Brushout of standard 1 = 6.50 g.
Brushout of standard 2 = 7.40 g.
Sample rating = 1.4

Hence, weight of standard paint of equivalent hiding is:

$$6.50 + 0.4(7.4 - 6.5) = 6.86 \text{ g.}$$

The volume of which is:

$$\frac{6.86 \times 8.33}{15.69} = 3.64 \text{ cubic centimeters.}$$

The volume of the sample is:

$$\frac{5.40 \times 8.33}{13.54} = 3.32 \text{ cubic centimeters.}$$

The relative hiding power of the sample is:

$$\frac{3.64}{3.32} \times 100 = 110$$

*Flat hiding power*

Strictly speaking, the expression "hiding power" should be applied only to paint formulae, i. e. to mixtures of pigment and/or extender and vehicle. Nevertheless, pigments and extenders may be said to possess potential hiding power and the potential hiding power of a pigment or extender in a flat paint formulation may be considered to be its flat hiding power. The flat hiding power of an extended pigment, for example, is defined as follows:

$$F.\,H.\,P. = \frac{\text{Wt. standard pigment per unit vol. standard paint}}{\text{Wt. extended pigment per unit vol. sample paint}} \times H.\,P.$$

in which F. H. P. is the flat hiding power of the extended pigment and H. P. is the hiding power of the extended pigment sample flat paint as determined by the hereinbefore described "Krebs dry film incomplete hiding power" procedure.

*Oil absorption*

Oil absorption is the amount of oil in grams required to wet 100 grams pigment or extender. The method of testing is described on pages 540—541 of Gardner's above cited book.

A five gram sample is used. Acid refined linseed oil of acid number 12.5 is added slowly from a burette and worked into the pigment or extender with a spatula on a smooth glass plate. The addition of oil is continued a drop or two at a time until the pigment or extender can be collected in one coherent mass adhering to the spatula but not wetting the glass. The amount of oil used to wet the pigment or extender is read from the burette.

This invention has as an object the production of extenders the surface hiding power of which has been increased to an extent heretofore unrealized. A further object is to increase the surface hiding power of extender materials having indices of refraction of not more than about 1.7. A still further object is the provision of extender materials having flat hiding powers markedly higher than those realized heretofore. A still further object is to increase the opacifying power of extender materials employed as paper fillers and in paper coating. A still further object is to increase the oil absorption of extenders. A still further object is to increase extender dry bulking value, i. e. the volume per unit weight of dry extender. Additional objects will become apparent from an examination of the following description and claims.

These objects are attained according to the herein described invention which broadly comprises mixing with an aqueous suspension of an extender a water soluble acid and a solution of an alkali soluble polymeric carbohydrate derivative which when treated with an acid is converted to an insoluble compound, thereafter dewatering the extender suspension and drying the extender, which extender is coated with an insoluble gel-like polymeric carbohydrate compound.

In a more restricted sense, this invention comprises mixing with an aqueous suspension of an extender material between about 0.2% and about 100% or higher, calculated as polymeric carbohydrate and based on the weight of the extender before treatment, of a solution of an alkali soluble polymeric carbohydrate derivative which when treated with an acid is converted to an insoluble compound. After the slurry has been agitated sufficiently to insure uniform distribution of the dissolved polymeric carbohydrate derivative, it is acidified, thereby forming a gel-like structure of a polymeric carbohydrate compound as a gel-like coating on the extender material particles. The slurry is subsequently de-watered, as by filtering, and the extender dried without calcination.

The preferred embodiment of this invention comprises mixing with an aqueous suspension of a white extender material, preferably magnesium silicate or clay, comprising in excess of about 250 grams extender per liter, between about 2% and about 20%, calculated as cellulose and based upon the weight of the extender before treatment, of a cellulose xanthate solution. After the slurry has been agitated sufficiently to insure uniform distribution of the added agent, it is acidified, by the addition of sulfuric acid. Subsequently the slurry is de-watered and the extender dried at a temperature between about 110° C. and about 130° C.

The following examples are given for illustrative purposes and are not intended to place any restrictions or limitations on the herein described invention:

*Example I*

1,430 grams cellulose xanthate solution comprising 7% cellulose and 6% NaOH, was added to 5 liters of an aqueous slurry of magnesium silicate extender containing 2,000 grams of said extender, i. e. the extender was treated with 5% cellulose. Dilute sulfuric acid was added to lower the pH to 6 and precipitate the cellulose on the surface of the extender. Bromine water was added in sufficient amount to bleach out the yellow tinge imparted by the xanthate. The resultant extender slurry was filtered and the extender dried at 115° C. and disintegrated by passing it through a squirrel cage disintegrator. The treated magnesium silicate extender had an oil absorption of 33.0 whereas said extender untreated had an oil absorption of only 15.7. In a representative flat paint formulation the hiding power of the treated extender was 72.3% greater than that of the untreated extender.

*Example II*

1,430 grams cellulose xanthate solution comprising 7% cellulose and 6% NaOH, was added to 5 liters of an aqueous slurry of a washed clay containing 2,000 grams of said clay, i. e. the clay was treated with 5% cellulose. Dilute sulfuric acid was added to lower the pH to 6 and precipitate the cellulose on the surface of the clay. Bromine water was added in sufficient amount to bleach out the yellow tinge imparted by the xanthate. The resultant clay slurry was filtered and the clay dried at 105° C. and disintegrated by passing it through a squirrel cage disintegrator. The treated clay had an oil absorption of 41.2 whereas said clay untreated had an oil absorption of 23.6. Furthermore, our novel process, as hereinabove exemplified, increased the dry bulking value of the clay by 70% and increased its brightening power in a casein paper coating composition by 35% and its opacifying and brightening power as a paper filler by 22%.

Various arrangements and selections of equipment for the operation of my novel process are possible. In the preferred arrangement, however, I add about 5%, on the basis of the extender, of cellulose in the form of cellulose xanthate solution to a suspension of extender in water in a mechanically agitated tank. The suspension is agitated sufficiently to insure complete dispersion of the dissolved cellulose and is then acidified, with sulfuric acid for example, precipitating gel-like cellulose on the surface of the extender particles. The extender thus treated is filtered, dried at about 120° C. and after dry milling to break up lumps formed on drying, is ready for use.

It is to be understood that the hereinbefore described specific embodiments of my invention may be subject to variation and modification without departing from the scope of this invention. For instance, while the invention has been described with particular application to the treatment of magnesium silicate and clay, the treatment of other types of white extender materials is also contemplated. Accordingly, the term "extender," as employed herein and in the appended claims includes not only magnesium silicates and clay but also such extender materials as anhydrite, gypsum, barium sulfate, calcium carbonate, calcium sulfite, barium carbonate, silica, aluminum silicates, aluminum oxide, magnesium fluoride, sodium fluoride, aluminum fluoride, sodium fluosilicate, sodium aluminum fluoride, magnesium fluosilicate, pachnolite, calcium fluoride, and the like, having a refractive index of not more than about 1.7.

It is still further to be understood that the treating agent employed may be one or any combination of solutions of alkali soluble polymeric carbohydrate derivatives which when treated with an acid are converted to insoluble compounds, said polymeric carbohydrate derivatives being selected from the group consisting of cellulose xanthate, cellulose dissolved in alkali metal hydroxide solution, urea cellulose (produced by the process described in U. S. Patent 2,134,825) dissolved in alkali metal hydroxide solution, sulfates of polymeric carbohydrates such as cellulose sulfate and starch sulfate dissolved in sodium hydroxide, alkali metal salts of carboxyalkyl ethers of polymeric carbohydrates such as sodium starch glycollate and sodium cellulose glycollate, alkali metal salts of acid esters of polymeric carbohydrates such as the sodium salt of the oxalic ester of cellulose and the sodium salt of cellulose phthalic acid, and alkali metal hydroxide solutions of low substituted cellulose ethers, whose alkali metal salts are insoluble in water but which are dissolved by 9% sodium hydroxide, such as glycol cellulose, ethyl cellulose and methyl cellulose. It is to be understood that the term "alkali soluble polymeric carbohydrate derivative which when treated with an acid is converted to an insoluble compound" as used herein and in the appended claims includes members of the aforementioned group. However, on account of their greater effectiveness, the treating agents which I prefer to employ are alkali metal hydroxide solutions of cellulose derivatives selected from the group consisting of cellulose xanthate, cellulose, and urea cellulose, which on subsequent acidification are precipitated on the extender material particles as a gel-like coating of cellulose. Because of the superior results obtained therewith, the cellulose derivative which I prefer to employ as the treating agent in my novel process, is an aqueous sodium hydroxide solution of cellulose xanthate.

It is still further to be understood that acidification of the solutions of the aforementioned alkali soluble polymeric carbohydrate derivatives in the presence of the extender material particles is an essential feature of my invention. Said acidification forms on the surface of said extender material particles a gel-like coating of a polymeric carbohydrate compound selected from the group consisting of cellulose, starch, carboxyalkyl ethers of polymeric carbohydrates such as starch glycollic acid and cellulose glycollic acid, acid esters of polymeric carbohydrates such as cellulose phthalic acid and the oxalic ester of cellulose, and cellulose ethers such as ethyl cellulose and methyl cellulose. It is to be understood "gel-like polymeric carbohydrate compound" as used herein and in the appended claims includes members of the aforementioned acid precipitated group. In most instances I prefer to add the solution of alkali soluble polymeric carbohydrate derivatives to the extender suspension and, thereafter, to precipitate the polymeric carbohydrate compound on the extender particles by addition of a water soluble acid, such as sulfuric acid, hydrochloric acid, a phosphoric acid, and the like. However, I may practice the herein described invention by addition of the polymeric carbohydrate derivative solution to a previously acidified extender suspension, although an account of the ease of manipulation, and the superior results ordinarily obtained thereby, I usually prefer to add the acid after addition of the polymeric carbohydrate derivative solution. In any event, it is essential that the extender material suspension after treatment with the polymeric carbohydrate derivative solution and acid, should have a pH of less than about 7 and preferably less than about 6. After the polymeric carbohydrate compound has been precipitated on the extender particles by reaction of the polymeric carbohydrate derivative solution with the acid, to provide an extender suspension having a pH of less than about 7, and preferably less than about 6, I have found it desirable to adjust the pH of said extender suspension to more than about 6 and preferably more than about 7 prior to the de-watering of said suspension, as by the addition of an alkaline reacting material such as barium hydroxide, sodium carbonate, and the like.

It is still further to be understood that the amount of treating agent required by a given extender material can best be learned by experimental trial and the amount will vary with the treating agent, the type and previous history of the extender material, the precipitating conditions, and the properties desired in the finished extender. With the agent which I have found most satisfactory, viz., cellulose xanthate, appreciable effects are had by addition of the cellulose xanthate in an amount corresponding to as little as about 0.2% cellulose based upon the weight of the extender in the slurry. For most ordinary purposes, however, I prefer to add the cellulose xanthate in amounts equivalent to from about 2% to about 20% cellulose. For increased effects, the cellulose xanthate may be added in amounts equivalent to as much as about 100% cellulose or higher.

It is still further to be understood that drying of the extender coated with a gell-like polymeric carbohydrate compound is an essential step in our novel process. It is essential that the extender after being coated with the gel-like agent should not be calcined. I have found it desirable to dry said extender at a temperature not in excess of about 200° C., and preferably not in excess of about 150° C. Temperatures of less than about 100° C. should be avoided unless the extender is dried at sub-atmospheric pressures.

The herein described process imparts to extender materials a new property which I call surface hiding power. The treating agent forms an amorphous gel surrounding the extender particles. Upon drying, this leaves a system of extender particle aggregates stabilized by a skeleton structure of the gel. Thus the treated extender is more porous and bulky than the untreated extender. As a consequence of my novel treatment there are imparted to extender materials, not only the property of surface hiding power, but also the properties of hitherto unrealized high oil absorption, high dry bulking value, high flat hiding power, and high opacifying and brightening power in paper and in coating compositions of casein, starch, and the like, applied to the surface of paper.

Minor increases in surface hiding power are of little industrial importance. Therefore, the extenders produced according to my novel process, as compared with prior art extenders, have an increase of at least about 10% and preferably at least about 15% in oil absorption, flat hiding power, and dry bulking value. Further, the opacifying and brightening power of said extenders is increased by at least about 10% and preferably at least about 15%, i. e. the opacifying and brightening power of coatings of casein, starch, and the like, when applied to paper is increased at least about 10% and preferably at least about 15%.

It is to be understood that the increase in opacifying and brightening power mentioned herein above, refers to the increased efficiency of an extender in a paper coating composition, i. e. an extender is defined as having x% higher opacifying and brightening power than another extender when 100 parts by weight of a coating composition, prepared as hereinafter described, comprising said extender, produces paper coatings equal in opacity and brightness to those produced by 100+x parts by weight of a similarly prepared coating composition comprising the other extender. The aforementioned coating compositions are prepared in the following manner. A casein solution is prepared by stirring 100 parts by weight casein for one half hour in 450 parts water, adding thereto 4 parts borax and 6 parts trisodium phosphate dissolved in 80 parts water at 65° C., heating the resultant mixture to 65° C. with stirring on a water bath, adding 10.85 parts by weight of ammonium hydroxide comprising 27% NH₃ by weight, allowing the whole to cool with stirring, and diluting with water to a total of 667 parts by weight. 25 parts by weight of the resultant casein solution is stirred into an intimately mixed extender water composition consisting of 43.7 parts by weight water and 31.25 parts extender.

My process possesses advantages not previously combined in a single process. Furthermore, the products of my process possess advantages not previously combined in an extender material. The high surface hiding extender resulting from the operation of my process, when used in flat paint formulations, imparts heretofore unrealized high hiding to the dry paint films. Such paint formulations are prepared at essentially the same cost and are far superior to flat paints hitherto manufactured. Furthermore, the novel extender products of my invention, when employed as paper fillers or in compositions of starch, casein, glue, and the like, applied to the surface of paper, produce papers which are definitely superior in opacity and brightness to those treated in an analogous manner with corresponding prior art extenders.

As many apparently widely different embodiments of this invention may be made without departing from the spirit and scope thereof, it is to be understood that I do not limit myself to the specific embodiments except as defined in the appended claims.

Having described the present invention the following is claimed as new and useful:

1. A process for producing an extender of improved surface hiding power which comprises mixing with an aqueous suspension of an extender, a water soluble acid and between about 0.2% and about 100%, calculated as polymeric carbohydrate and based on the weight of the extender before treatment, of an alkaline solution of an alkali soluble polymeric carbohydrate derivative which when treated with an acid is converted to an insoluble compound, the pH of the suspension after treatment with the polymeric carbohydrate derivative and acid being less than about 7 thereby forming on the surface of said extender material particles a coating of a gel-like polymeric carbohydrate compound, thereafter de-watering the extender suspension and drying the extender at a temperature not in excess of about 200° C.

2. A process for producing an extender of improved surface hiding power which comprises mixing with an aqueous suspension of an extender, between about 0.2% and about 100%, calculated as polymeric carbohydrate and based on the weight of the extender before treatment, of an alkaline solution of an alkali soluble polymeric carbohydrate derivative which when treated with an acid is converted to an insoluble compound, thereafter acidifying the slurry to a pH of less than about 7 thereby forming on the surface of said extender material particles a coating of a gel-like polymeric carbohydrate compound, and thereafter de-watering the extender slurry and drying the extender at a temperature not in excess of about 200° C.

3. A process for producing an extender of improved surface hiding power, which comprises mixing with an aqueous suspension of an extender a water soluble acid and between about 0.2% and about 100%, calculated as cellulose and based on the weight of the extender before treatment of alkali metal hydroxide solution of a cellulose compound selected from the class consisting of cellulose xanthate, cellulose, and urea cellulose, the pH of the suspension after treatment with the cellulose compound solution and acid being less than about 7 thereby precipitating the cellulose as a gel-like coating on said extender, de-watering the extender suspension and drying the extender at a temperature not in excess of about 200° C.

4. A process for producing an extender of improved surface hiding power, which comprises mixing with an aqueous suspension of an extender between about 2% and about 20%, calculated as cellulose and based on the weight of the extender before treatment, of alkali metal hydroxide solution of a cellulose compound selected from the class consisting of cellulose xanthate, cellulose and urea cellulose, acidifying the slurry to a pH below about 6 thereby precipitating the cellulose as a gel-like coating on said extender, and thereafter dewatering the extender slurry and drying the extender at a temperature not in excess of about 200° C.

5. A process for producing an extender of improved surface hiding power which comprises mixing with an aqueous suspension of an extender between about 2% and about 20%, calculated as cellulose and based on the weight of the extender before treatment, of an alkali metal hydroxide solution of cellulose xanthate and a water soluble acid, the pH of the suspension after treatment with the cellulose xanthate solution and acid being less than about 6 thereby precipitating the cellulose as a gel-like coating on said extender, dewatering the extender suspension and drying the extender at a temperature not in excess of about 150° C.

6. A process for producing an extender of improved surface hiding power which comprises mixing with an aqueous suspension of an extender between about 0.2% and about 100%, calculated as cellulose and based on the weight of the extender before treatment, of an alkali metal hydroxide solution of urea cellulose, acidifying the slurry to a pH below about 6, dewatering said slurry and drying the extender at a temperature not in excess of about 200° C.

7. A process for producing an extender of improved surface hiding power which comprises mixing with an aqueous suspension of an extender between about 0.2% and about 100%, calculated as cellulose and based on the weight of the extender before treatment, of an alkali metal hydroxide solution of cellulose xanthate, acidifying the slurry to a pH below about 6, dewatering said slurry and drying the extender at a temperature not in excess of about 200° C.

8. A process for producing an extender of improved surface hiding power which comprises mixing with an aqueous suspension of an extender between about 2% and about 20%, calculated as cellulose and based on the weight of the extender before treatment, of an alkali metal hydroxide solution of cellulose xanthate, acidifying the slurry to a pH below about 6 by the addition of sulfuric acid, and subsequently dewatering the slurry and drying the extender at a temperature not in excess of about 150° C.

9. An extender of improved surface hiding power which comprises an extender coated with between about 0.2% and about 100%, calculated as polymeric carbohydrate and based on the weight of the extender before treatment of an acid-precipitated gel-like polymeric carbohydrate compound.

10. An extender of improved surface hiding power which comprises an extender coated with acid-precipitated gel-like cellulose in an amount in the range of from about 0.2% to about 100%, calculated as cellulose and based on the weight of the extender before treatment.

11. An improved extender comprising an extender coated with between about 2% and about 20%, calculated as cellulose and based on the weight of the extender before treatment of an acid-precipitated gel-like cellulose material, said improved extender having at least about 10% higher opacifying and brightening power than a comparable untreated extender.

12. A process for producing an extender of improved surface hiding power which comprises mixing with an aqueous suspension of an extender, a water-soluble acid and an alkaline solution in an amount equivalent to from about 0.2% to about 100% calculated as cellulose and based on the weight of the extender before treatment, of an alkali soluble cellulose derivative which when treated with an acid is converted to an insoluble compound, the pH of the extender material suspension after treatment with the cellulose derivative and acid being less than about 7, thereby forming on the surface of said extender material particles a coating of a gel-like cellulosic compound, thereafter dewatering the extender suspension and drying the extender at a temperature not in excess of about 200° C.

13. An extender of improved surface hiding power which comprises an extender coated with between about 0.2% and about 100%, calculated as cellulose and based on the weight of the extender before treatment, of an acid-precipitated gel-like cellulosic compound.

14. A process for producing an extender of improved surface hiding power which comprises mixing with an aqueous suspension of magnesium silicate between about 2% and about 20%, calculated as cellulose and based on the weight of the magnesium silicate before treatment, of an alkali metal hydroxide solution of cellulose xanthate, acidifying the slurry to a pH below about 6 by the addition of sulfuric acid, and subsequently dewatering the slurry and drying the extender at a temperature not in excess of about 150° C.

15. A process for producing an extender of improved surface hiding power which comprises mixing with an aqueous suspension of clay between about 2% and about 20%, calculated as cellulose and based on the weight of the magnesium silicate before treatment, of an alkali metal hydroxide solution of cellulose xanthate, acidifying the slurry to a pH below about 6 by the addition of sulfuric acid, and subsequently dewatering the slurry and drying the extender at a temperature not in excess of about 150° C.

16. An extender of improved surface hiding power which comprises magnesium silicate coated with between about 2% and about 20%, calculated as cellulose and based on the weight of the magnesium silicate before treatment, of an acid-precipitated gel-like cellulosic compound.

17. An extender of improved surface hiding power which comprises clay coated with between about 2% and about 20%, calculated as cellulose and based on the weight of the clay before treatment, of an acid-precipitated gel-like cellulosic compound.

MARION L. HANAHAN.